United States Patent [19]

Higuchi et al.

[11] Patent Number: 4,592,858

[45] Date of Patent: Jun. 3, 1986

[54] SMECTIC LIQUID CRYSTAL COMPOUND AND LIQUID CRYSTAL COMPOSITIONS

[75] Inventors: Ryoichi Higuchi, Tokyo; Masao Honma, Yokohama; Takao Sakurai, Kawasaki; Naoko Mikami, Yokohama, all of Japan

[73] Assignee: Ajinomoto Company, Inc., Tokyo, Japan

[21] Appl. No.: 722,668

[22] Filed: Apr. 12, 1985

[30] Foreign Application Priority Data

Apr. 13, 1984 [JP] Japan ................................. 59-74748

[51] Int. Cl.$^4$ .......................... C09K 3/34; G02F 1/13; C07C 69/76; C07C 69/00
[52] U.S. Cl. ........................... 252/299.66; 252/299.01; 252/299.65; 252/299.5; 350/350 S; 560/105; 560/141
[58] Field of Search ...................... 252/299.01, 299.64, 252/299.67, 299.66, 299.65, 299.5; 350/350 R, 350 S; 560/105, 141

[56] References Cited

FOREIGN PATENT DOCUMENTS 0136725  10/1985  European Pat. Off. ....... 252/299.66

OTHER PUBLICATIONS

Goodby & Leslie, Liquid–Crystals and Ordered Fluids, vol. 4, 1984, pp. 1–32.
Abdulin et al, Zh. Org. Khim., 18(10), 2170–2173 (1982).
Hori, Mol. Cryst. Liq. Cryst., 82, 13–17 (1982).
P. H. Martinot, Lagarde, J. Physique, 37, C3-129 (1976).
Gray & Goodby, Mol. Cryst. Liq. Cryst., 1976, vol. 37, pp. 157–188.
Abdulin et al., Journal of Organic Chemistry of USSR, Mar. 20, 1983, pp. 1913–1915.

*Primary Examiner*—Teddy S. Gron
*Assistant Examiner*—J. E. Thomas
*Attorney, Agent, or Firm*—Oblon, Fisher, Spivak, McClelland & Maier

[57] ABSTRACT

A liquid crystal compound of the formula:

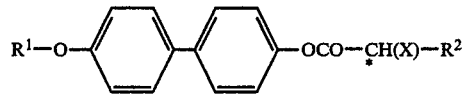

wherein $R^1$ is an alkyl group, X is chloro or bromo, and $R^2$ is a branched-alkyl group; and the carbon atom marked with an * is an asymmetric carbon atom.

7 Claims, 1 Drawing Figure

SMECTIC LIQUID CRYSTAL COMPOUND AND LIQUID CRYSTAL COMPOSITIONS

BACKGROUND OF THE INVENTION

1. Field of the Invention

The present invention relates to a liquid crystal compound and a liquid crystal composition containing said liquid crystal compound.

2. Description of the Prior Art

Liquid crystal displays are in widespread use at present. Most of the displays are twisted nematic types which use nematic liquid crystals. However, the nematic liquid crystals have the disadvantage of a long response time of about a few milliseconds.

Some years ago a high speed response liquid crystal display device was proposed which utilizes a ferroelectric liquid crystal compound which gives rise to an optical switching phenomenon.

Ferroelectric liquid crystals were discovered by R. B. Meyer et al (J. Physique, 36, 1–69 (1975)). Moreover, a high speed optical switching phenomenon was discovered for the chiral smectic C phase of ferroelectric liquid crystals by N. A. Clark et al. (Appl. Phys. Lett. 36, 899 (1980)).

The high speed switching of ferroelectric liquid crystals can be utilized in many applications, not only for displays, but also printer heads, light valves, and the like.

For the purposes mentioned above, the compounds which are desired are those which are stable and which show a ferroelectric phase at room temperature with large spontaneous polarization, which is needed for a high speed response at relatively low voltage.

Some smectic phases of ferroelectric liquid crystals are known such as the smectic C, smectic F, smectic H and smectic G, and the like phases.

It is said that the smectic C phase is most suitable for use in displays, because the viscosity of the other phases is so high that a high speed response is not expected.

In Table 1 infra, the compounds which are listed are those which are known as ferroelectric liquid crystal compounds. In Table 1, C stands for a crystal phase, SH* for a chiral smectic H phase, SC* for a chiral smectic C phase, SG* for a chiral smectic G phase, SF* for a chiral smectic F phase, SA for a smectic A phase, Ch for a cholesteric phase, and I for an isotropic phase.

Some of the ferroelectric liquid crystal compounds shown, i.e. Compound No. 1 and 2, have a Shiff base (—CH=N—) structure, which means that they are easily hydrolyzed, and accordingly, the compounds are not stable. On the other hand, Compounds 3 and 4 don't have a Shiff-base structure, but they have small spontaneous polarization. The values of spontaneous polarization are less than 10 nC/cm². Still further Compounds 5–7 show a smectic F phase, which phase is highly viscous and is an unsuitable phase for the display because of the rather slow switching speed of the compounds. Moreover, the temperature range of the smectic F phase of these compounds is far from room temperature. A need therefore continues to exist for liquid crystal compounds which are stable, which have large spontaneous polarizations and which have satisfactory temperature ranges for displays.

SUMMARY OF THE INVENTION

Accordingly, one object of the present invention is to provide a stable smectic liquid crystal compound which possess a large spontaneous polarization about room temperature and a liquid crystal composition containing said liquid crystal compound.

Briefly, this object and other objects of the invention as hereinafter will become more readily apparent can be attained by a liquid crystal of the formula:

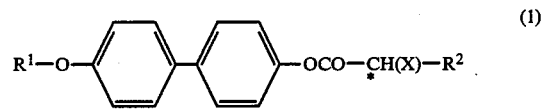

wherein $R^1$ is alkyl, X is halogen, $R^2$ is branched alkyl, aralkyl or phenyl and the carbon atom marked by (*) is an asymmetric carbon atom.

TABLE 1

| No. | Chemical Structure | Phase transition temperature (°C.) |
|---|---|---|
| 1 | $C_{10}H_{21}O$—⟨Ph⟩—CH=N—⟨Ph⟩—CH=CH—C(=O)—O—$CH_2\overset{*}{C}H C_2H_5$ with $CH_3$ branch | C $\overset{73}{\rightleftarrows}$ SC* $\overset{93}{\rightleftarrows}$ SA $\overset{116}{\rightleftarrows}$ I;  SH* $\overset{10}{\rightleftarrows}$ |
| 2 | $C_8H_{17}O$—⟨Ph⟩—CH=N—⟨Ph⟩—CH=CH—C(=O)—O—$CH_2\overset{*}{C}HCH_3$ with Cl branch | C $\overset{60}{\rightleftarrows}$ SH* $\overset{64}{\rightleftarrows}$ SC* $\overset{98}{\rightleftarrows}$ SA $\overset{135}{\rightleftarrows}$ I |
| 3 | $C_{10}H_{21}O$—⟨Ph⟩—⟨Ph⟩—C(=O)—O—$CH_2\overset{*}{C}H C_3H_5$ with $CH_3$ branch | C $\overset{46.5}{\rightleftarrows}$ SA $\rightleftarrows$ I; SC* $\overset{38}{\rightleftarrows}$ |
| 4 | $C_{10}H_{21}O$—⟨Ph⟩—O—C(=O)—⟨Ph⟩—⟨Ph⟩—$CH_2\overset{*}{C}H C_2H_5$ with $CH_3$ branch | C $\overset{61}{\rightarrow}$ SC* $\rightarrow$ Ch $\overset{164.5}{\rightarrow}$ I |
| 5 | $C_8H_{17}O$—⟨Ph⟩—⟨Ph⟩—OCCHCH₂CH₃ with OCl | C $\overset{70}{\leftarrow}$ SG* $\overset{92}{\leftarrow}$ SF* $\overset{95}{\leftarrow}$ SA $\overset{105}{\leftarrow}$ I |
| 6 | $C_{10}H_{17}O$—⟨Ph⟩—⟨Ph⟩—OC—CHCH₂CH₃ with O, Cl | C $\overset{80}{\leftarrow}$ SG* $\overset{83}{\leftarrow}$ SF* $\overset{95}{\leftarrow}$ SA $\overset{102}{\leftarrow}$ I |

TABLE 1-continued

| No. | Chemical Structure | Phase transition temperature (°C.) |
| --- | --- | --- |
| 7 | 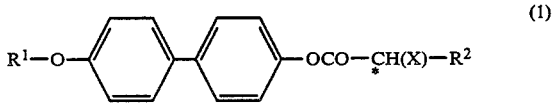 | C $\xleftarrow{72}$ SG* $\xleftarrow{74}$ SF* $\xleftarrow{95}$ SA $\xleftarrow{101}$ I |

1,2 Ph. Martinot, Lagarde; J. Physique, 37 C3-129 (1976)
3 Abdulin. AZ. et al; Zh. Org. Khim, 18(10) 2170~2173 (1982)
4 K. Hori; Mol. Crys. Liq. Crys., 82 13~17 (1982)
5,6,7 J. W. Goodby et al; Proceedings of 1983 A.C.S. Meeting, Las Vegas, Nevada, 1982. Liquid Crystals and Ordered Fluids, Vol. 4 Fl

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
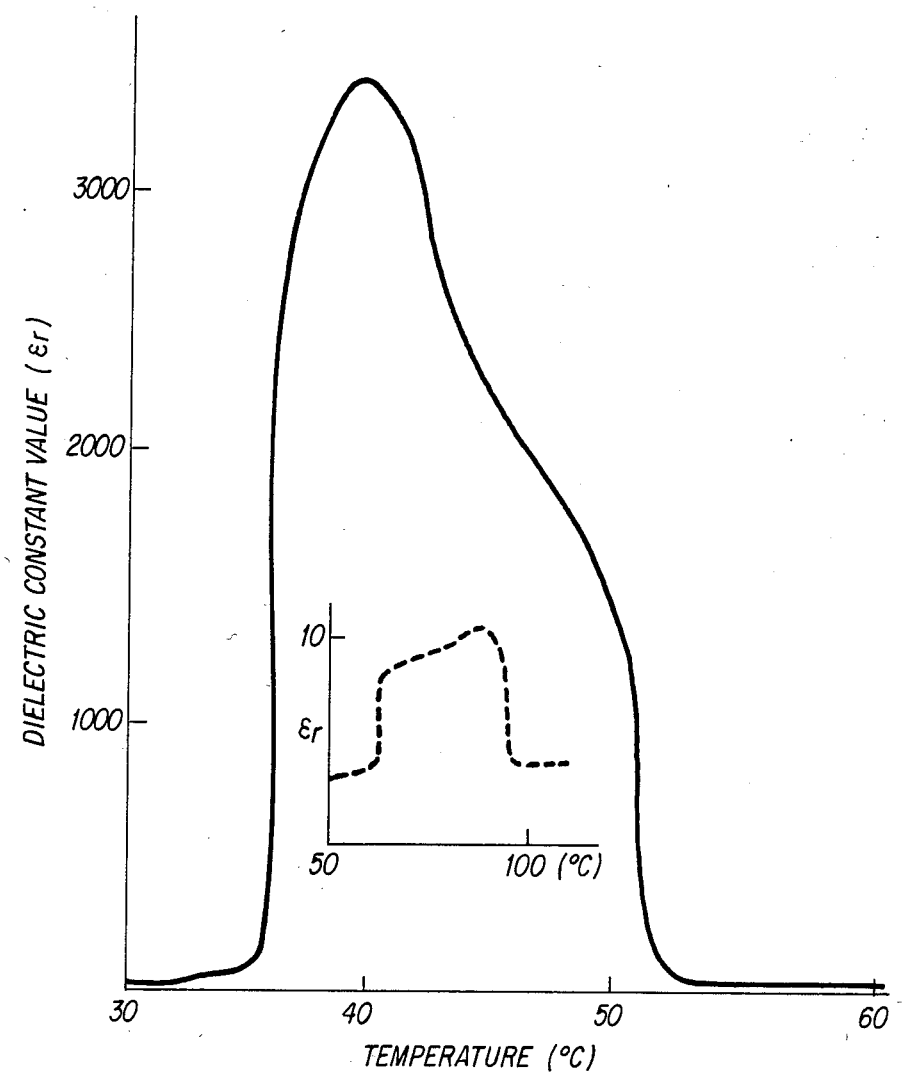
FIG. 1 is the graphical representation of the relationship between the temperatures and the dielectric constant values of embodiments of the liquid crystal compound of the present invention.

In the present specification, a smectic liquid crystal compound is defined as a compound which shows a smectic A phase, a chiral smectic C phase, or any smectic phase under appropriate conditions; and a compound which does not show a smectic phase itself, but emerges in a desirable temperature range for a chiral smectic C phase when mixed with another smectic liquid compound.

The smectic liquid crystal compounds of the present invention have the formula (1):

 (1)

wherein Rhu 1 is an alkyl group; X is halogen is a branched-alkyl group or aralkyl group such as isopropyl, isobutyl, 1-methylpropyl, 1,1-dimethylpropyl, benzyl, 1-methylbutyl, 2-methylbutyl, 1,1-dimethylbutyl, 1,2-dimethylbutyl, 3-methylbutyl, 1-methylpentyl, 2-methylpentyl, 1,1-dimethylpentyl, phenyl; and the carbon atom marked with * is an asymmetric carbon atom.

An aspect of the present application is a liquid crystal composition which is the combination of at least two liquid crystal components, at least one of which is a liquid crystal compound represented by formula (1) above.

As mentioned supra, many ferroelectric liquid crystals are known, but ferroelectric liquid crystals which are stable and which show a large spontaneous polarization up to 10 nC/cm$^2$ are not yet known.

The smectic liquid compound of the present invention is stable, because the structure has two benzene rings which are connected directly to each other unlike such compounds as DOBAMBC whose two benzene rings are linked together by an unstable Shiff-base functional group. The smectic liquid crystal compounds of the invention exhibit high spontaneous polarization in the chiral smectic C phase, because they have an optically active group, as shown by formula (2) as follows:

$$-\underset{*}{C}H(X)-R^2 \quad (2)$$

wherein R$^2$ is a branched-alkyl group and X is chloro or bromo.

Since the compound of the present invention has a strong electric dipole at the chiral center in the terminal part of the molecule, the compound exhibits strong ferroelectricity. Moreover, because the present compound has a branched-alkyl group at the terminal portion of the molecule, it has a chiral smectic C phase rather than other chiral smectic phases and also has a desirable temperature range for the ferroelectric phase.

A ferroelectric liquid crystal compound of formula (3) below, for which detailed data are provided in Table 2, is known, but the compounds do not have a branched-alkyl group and do not show a chiral smectic C phase, but only a chiral smectic F phase which is said to be a hard phase and not suitable for displays. Moreover, the known compounds show an undesirable ferroelectric temperature range which is far above room temperature.

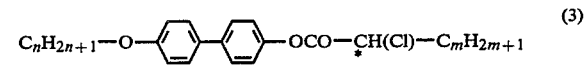 (3)

The compound of the invention however, which has a terminally located branched-alkyl group shows a chiral smectic C phase. Moreover, in some cases, the chiral smectic C phase is near room temperature.

As shown in the examples described below, the smectic liquid compounds of the present invention are effective when combined with other liquid crystal compounds in lowering the temperature range of the ferroelectric phase of the resulting liquid crystal composition to around room temperature.

The compounds of formula (1) above of the present invention are most suitably prepared by reacting a 4-(4'-alkoxyphenyl)phenol with an optically active acid. 4-(4'-Alkoxyphenyl)phenol in turn can be prepared by reacting an alkyl bromide with p-p'-biphenol by the Williamson synthesis. The optically active acid can be prepared by the halogenation of an amino acid or a hydroxy acid such as isoleucine, valine, leucine, phenylalanine, alloisoleucine, glutamic acid, lysine, aspartic acid, tert-leucine, threonine, serine, phenyl glycine, lactic acid, mandelic acid, tropic acid, 3-hydroxybutyric acid, tartaric acid or the like. Further, an optically active acid can also be prepared by an asymmetric synthesis or by the resolution of a racemic acid.

Having generally described this invention, a further understanding can be obtained by reference to certain specific examples which are provided herein for purposes of illustration only and are not intended to be limiting unless otherwise specified.

The phase transition temperature values shown in the following examples may vary slightly depending on the method used for measuring the temperature or the purity of the product.

EXAMPLE 1

Synthesis and properties of (S,S)-3-methyl-2-chloropentanoic acid 4'-(4''-octyloxyphenyl)phenyl ester

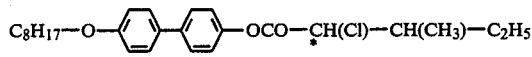

An 8 g amount (S,S)-3-methyl-2-chloropentanoic acid, 16 g of 4-(4'-octyloxyphenyl)phenol, 11 g of N,N'-dicyclohexylcarbodiimide, 1 g of 4-pyridinopyridine and 500 ml of dichloromethane were mixed and allowed to stand for the night. After the precipitate was removed, the solution was evaporated to obtain a crude product. The product was passed through a chromatographic column of silica, and recrystallized from hexane whereby purified (S,S)-3-methyl-2-chloropentanoic acid 4'-(4''-octyloxyphenyl)phenyl ester was obtained.

The product was placed between two nesa coated glass plates. The spontaneous polarization and the dielectric constant of the compound were measured by the Sowyer Tower method and a capacitance bridge.

The maximum value of the spontaneous polarization was 210 nC/cm$^2$. FIG. 1 shows the temperature dependence of the dielectric constant (S,S)-3-methyl-2-chloropentanoic acid 4'-(4''-octyloxyphenyl)phenyl ester and DOBAMBC.

The cell was placed between to crossing polarizers and the change of the intensity of the transmitted light when the electric field was applied was measured. The response time was about 3 micro seconds.

EXAMPLE 2

The following additional compounds within the scope of the present invention having different R$^1$, X and R$^2$ substituents from those in the compound of Example 1 were prepared. These compounds can be prepared in the same manner as described in Example 1. All of the compounds are optically active compounds.

(1) 3-Methyl-2-chloropentanoic acid 4'-(4''-methoxyphenyl)phenyl ester
(2) 3-Methyl-2-chloropentanoic acid 4'-(4''-ethoxyphenyl)phenyl ester
(3) 3-Methyl-2-chloropentanoic acid 4'-(4''-propoxyphenyl)phenyl ester
(4) 3-Methyl-2-chloropentanoic acid 4'-(4''-butoxyphenyl)phenyl ester
(5) 3-Methyl-2-chloropentanoic acid 4'-(4''-pentoxyphenyl)phenyl ester
(6) 3-Methyl-2-chloropentanoic acid 4'-(4''-hexyloxyphenyl)phenyl ester
(7) 3-Methyl-2-chloropentanoic acid 4'-(4''-heptyloxyphenyl)phenyl ester
(8) 3-Methyl-2-chloropentanoic acid 4'-(4''-octyloxyphenyl)phenyl ester
(9) 3-Methyl-2-chloropentanoic acid 4'-(4''-nonyloxyphenyl)phenyl ester
(10) 3-Methyl-2-chloropentanoic acid 4'-(4''-decyloxyphenyl)phenyl ester
(11) 3-Methyl-2-chloropentanoic acid 4'-(4''-undecyloxyphenyl)phenyl ester
(12) 3-Methyl-2-chloropentanoic acid 4'-(4''-dodecyloxyphenyl)phenyl ester
(13) 3-Methyl-2-chloropentanoic acid 4'-(4''-tridecyloxyphenyl)phenyl ester
(14) 3-Methyl-2-chloropentanoic acid 4'-(4''-tetradecyloxyphenyl)phenyl ester
(15) 3-Methyl-2-chloropentanoic acid 4'-(4''-pentadecyloxyphenyl)phenyl ester
(16) 3-Methyl-2-chloropentanoic acid 4'-(4''-hexadecyloxyphenyl)phenyl ester
(17) 3-Methyl-2-chloropentanoic acid 4'-(4''-heptadecyloxyphenyl)phenyl ester
(18) 3-Methyl-2-chloropentanoic acid 4'-(4''-octadecyloxyphenyl)phenyl ester
(19) 3-Methyl-2-bromopentanoic acid 4'-(4''-methoxyphenyl)phenyl ester
(20) 3-Methyl-2-bromopentanoic acid 4'-(4''-ethoxyphenyl)phenyl ester
(21) 3-Methyl-2-bromopentanoic acid 4'-(4''-propoxyphenyl)phenyl ester
(22) 3-Methyl-2-bromopentanoic acid 4'-(4''-butoxyphenyl)phenyl ester
(23) 3-Methyl-2-bromopentanoic acid 4'-(4''-pentoxyphenyl)phenyl ester
(24) 3-Methyl-2-bromopentanoic acid 4'-(4''-hexyloxyphenyl)phenyl ester
(25) 3-Methyl-2-bromopentanoic acid 4'-(4''-heptyloxyphenyl)phenyl ester
(26) 3-Methyl-2-bromopentanoic acid 4'-(4''-octyloxyphenyl)phenyl ester
(27) 3-Methyl-2-bromopentanoic acid 4'-(4''-nonyloxyphenyl)phenyl ester
(28) 3-Methyl-2-bromopentanoic acid 4'-(4''-decyloxyphenyl)phenyl ester
(29) 3-Methyl-2-bromopentanoic acid 4'-(4''-undecyloxyphenyl)phenyl ester
(30) 3-Methyl-2-bromopentanoic acid 4'-(4''-dodecyloxyphenyl)phenyl ester
(31) 3-Methyl-2-bromopentanoic acid 4'-(4''-tridecyloxyphenyl)phenyl ester
(32) 3-Methyl-2-bromopentanoic acid 4'-(4''-tetradecyloxyphenyl)phenyl ester
(33) 3-Methyl-2-bromopentanoic acid 4'-(4''-pentadecyloxyphenyl)phenyl ester
(34) 3-Methyl-2-bromopentanoic acid 4'-(4''-hexadecyloxyphenyl)phenyl ester
(35) 3-Methyl-2-bromopentanoic acid 4'-(4''-heptadecyloxyphenyl)phenyl ester
(36) 3-Methyl-2-bromopentanoic acid 4'-(4''-octadecyloxyphenyl)phenyl ester
(37) 4-Methyl-2-chloropentanoic acid 4'-(4''-methoxyphenyl)phenyl ester
(38) 4-Methyl-2-chloropentanoic acid 4'-(4''-ethoxyphenyl)phenyl ester
(39) 4-Methyl-2-chloropentanoic acid 4'-(4''-propoxyphenyl)phenyl ester
(40) 4-Methyl-2-chloropentanoic acid 4'-(4''-butoxyphenyl)phenyl ester
(41) 4-Methyl-2-chloropentanoic acid 4'-(4''-pentoxyphenyl)phenyl ester
(42) 4-Methyl-2-chloropentanoic acid 4'-(4''-hexyloxyphenyl)phenyl ester
(43) 4-Methyl-2-chloropentanoic acid 4'-(4''-heptyloxyphenyl)phenyl ester
(44) 4-Methyl-2-chloropentanoic acid 4'-(4''-octyloxyphenyl)phenyl ester
(45) 4-Methyl-2-chloropentanoic acid 4'-(4''-nonyloxyphenyl)phenyl ester

(46) 4-Methyl-2-chloropentanoic acid 4'-(4'''-decyloxyphenyl)phenyl ester
(47) 4-Methyl-2-chloropentanoic acid 4'-(4'''-undecyloxyphenyl)phenyl ester
(48) 4-Methyl-2-chloropentanoic acid 4'-(4'''-dodecyloxyphenyl)phenyl ester
(49) 4-Methyl-2-chloropentanoic acid 4'-(4'''-tridecyloxyphenyl)phenyl ester
(50) 4-Methyl-2-chloropentanoic acid 4'-(4'''-tetradecyloxyphenyl)phenyl ester
(51) 4-Methyl-2-chloropentanoic acid 4'-(4'''-pentadecyloxyphenyl)phenyl ester
(52) 4-Methyl-2-chloropentanoic acid 4'-(4'''-hexadecyloxyphenyl)phenyl ester
(53) 4-Methyl-2-chloropentanoic acid 4'-(4'''-heptadecyloxyphenyl)phenyl ester
(54) 4-Methyl-2-chloropentanoic acid 4'-(4'''-octadecyloxyphenyl)phenyl ester
(55) 3-Methyl-2-chlorobutanoic acid 4'-(4'''-methoxyphenyl)phenyl ester
(56) 3-Methyl-2-chlorobutanoic acid 4'-(4'''-ethoxyphenyl)phenyl ester
(57) 3-Methyl-2-chlorobutanoic acid 4'-(4'''-propoxyphenyl)phenyl ester
(58) 3-Methyl-2-chlorobutanoic acid 4'-(4'''-butoxyphenyl)phenyl ester
(59) 3-Methyl-2-chlorobutanoic acid 4'-(4'''-pentoxyphenyl)phenyl ester
(60) 3-Methyl-2-chlorobutanoic acid 4'-(4'''-hexyloxyphenyl)phenyl ester
(61) 3-Methyl-2-chlorobutanoic acid 4'-(4'''-heptyloxyphenyl)phenyl ester
(62) 3-Methyl-2-chlorobutanoic acid 4'-(4'''-octyloxyphenyl)phenyl ester
(63) 3-Methyl-2-chlorobutanoic acid 4'-(4'''-nonyloxyphenyl)phenyl ester
(64) 3-Methyl-2chlorobutanoic acid 4'-(4'''-decyloxyphenyl)phenyl ester
(65) 3-Methyl-2-chlorobutanoic acid 4'-(4'''- undecyloxyphenyl)phenyl ester
(66) 3-Methyl-2-chlorobutanoic acid 4'-(4'''-dodecyloxyphenyl)phenyl ester
(67) 3-Methyl-2-chlorobutanoic acid 4'-(4'''-tridecyloxyphenyl)phenyl ester
(68) 3-Methyl-2-chlorobutanoic acid 4'-(4'''-tetradecyloxyphenyl)phenyl ester
(69) 3-Methyl-2-chlorobutanoic acid 4'-(4'''-pentadecyloxyphenyl)phenyl ester
(70) 3-Methyl-2-chlorobutanoic acid 4'-(4'''-hexadecyloxyphenyl)phenyl ester
(71) 3-Methyl-2-chlorobutanoic acid 4'-(4'''-heptadecyloxyphenyl)phenyl ester
(72) 3-Methyl-2-chlorobutanoic acid 4'-(4'''-octadecyloxyphenyl)phenyl ester
(73) 3-Phenyl-2-chloropentanoic acid 4'-(4'''-methoxyphenyl)phenyl ester
(74) 3-Phenyl-2-chloropentanoic acid 4'-(4'''-ethoxyphenyl)phenyl ester
(75) 3-Phenyl-2-chloropentanoic acid 4'-(4'''-propoxyphenyl)phenyl ester
(76) 3-Phenyl-2-chloropentanoic acid 4'-(4'''-butoxyphenyl)phenyl ester
(77) 3-Phenyl-2-chloropentanoic acid 4'-(4'''-pentoxyphenyl)phenyl ester
(78) 3-Phenyl-2-chloropentanoic acid 4'-(4'''-hexyloxyphenyl)phenyl ester
(79) 3-Phenyl-2-chloropentanoic acid 4'-(4'''-heptyloxyphenyl)phenyl ester
(80) 3-Phenyl-2-chloropentanoic acid 4'-(4'''-octyloxyphenyl)phenyl ester
(81) 3-Phenyl-2-chloropentanoic acid 4'-(4'''-nonyloxyphenyl)phenyl ester
(82) 3-Phenyl-2-chloropentanoic acid 4'-(4'''-decyloxyphenyl)phenyl ester
(83) 3-Phenyl-2-chloropentanoic acid 4'-(4'''-undecyloxyphenyl)phenyl ester
(84) 3-Phenyl-2-chloropentanoic acid 4'-(4'''-dodecyloxyphenyl)phenyl ester
(85) 3-Phenyl-2-chloropentanoic acid 4'-(4'''-tridecyloxyphenyl)phenyl ester
(86) 3-Phenyl-2-chloropentanoic acid 4'-(4'''-tetradecyloxyphenyl)phenyl ester
(87) 3-Phenyl-2-chloropentanoic acid 4'-(4'''-pentadecyloxyphenyl)phenyl ester
(88) 3-Phenyl-2-chloropentanoic acid 4'-(4'''-hexadecyloxyphenyl)phenyl ester
(89) 3-Phenyl-2-chloropentanoic acid 4'-(4'''-heptadecyloxyphenyl)phenyl ester
(90) 3-Phenyl-2-chloropentanoic acid 4'-(4'''-octadecyloxyphenyl)phenyl ester
(91) 3-Methyl-2-bromobutanoic acid 4'-(4'''-methoxyphenyl)phenyl ester
(92) 3-Methyl-2-bromobutanoic acid 4'-(4'''-ethoxyphenyl)phenyl ester
(93) 3-Methyl-2-bromobutanoic acid 4'-(4'''-propoxyphenyl)phenyl ester
(94) 3-Methyl-2-bromobutanoic acid 4'-(4'''-butoxyphenyl)phenyl ester
(95) 3-Methyl-2-bromobutanoic acid 4'-(4'''-pentoxyphenyl)phenyl ester
(96) 3-Methyl-2-bromobutanoic acid 4'-(4'''-hexyloxyphenyl)phenyl ester
(97) 3-Methyl-2-bromobutanoic acid 4'-(4'''-heptyloxyphenyl)phenyl ester
(98) 3-Methyl-2-bromobutanoic acid 4'-(4'''-octyloxyphenyl)phenyl ester
(99) 3-Methyl-2-bromobutanoic acid 4'-(4'''-nonyloxyphenyl)phenyl ester
(100) 3-Methyl-2-bromobutanoic acid 4'-(4'''-decyloxyphenyl)phenyl ester
(101) 3-Methyl-2-bromobutanoic acid 4'-(4'''-undecyloxyphenyl)phenyl ester
(102) 3-Methyl-2-bromobutanoic acid 4'-(4'''-dodecyloxyphenyl)phenyl ester
(103) 3-Methyl-2-bromobutanoic acid 4'-(4'''-tridecyloxyphenyl)phenyl ester
(104) 3-Methyl-2-bromobutanoic acid 4'-(4'''-tetradecyloxyphenyl)phenyl ester
(105) 3-Methyl-2-bromobutanoic acid 4'-(4'''-pentadecyloxyphenyl)phenyl ester
(106) 3-Methyl-2-bromobutanoic acid 4'-(4'''-hexadecyloxyphenyl)phenyl ester
(107) 3-Methyl-2-bromobutanoic acid 4'-(4'''-heptadecyloxyphenyl)phenyl ester
(108) 3-Methyl-2-bromobutanoic acid 4'-(4'''-octadecyloxyphenyl)phenyl ester
(109) 3-Methyl-2-fluoropentanoic acid 4'-(4'''-methoxyphenyl)phenyl ester
(110) 3-Methyl-2-fluoropentanoic acid 4'-(4'''-ethoxyphenyl)phenyl ester
(111) 3-Methyl-2-fluoropentanoic acid 4'-(4'''-propoxyphenyl)phenyl ester
(112) 3-Methyl-2-fluoropentanoic acid 4'-(4'''-butoxyphenyl)phenyl ester
(113) 3-Methyl-2-fluoropentanoic acid 4'-(4'''-pentoxyphenyl)phenyl ester (114) 3-Methyl-2-fluoropentanoic acid 4'-(4'''-hexyloxyphenyl)phenyl ester
(115) 4-Methyl-2-fluoropentanoic acid 4'-(4'''-heptyloxyphenyl) phenyl ester
(116) 3-Methyl-2-fluoropentanoic acid 4'-(4'''-octyloxyphenyl)phenyl ester
(117) 3-Methyl-2-fluoropentanoic acid 4'-(4'''-nonyloxyphenyl)phenyl ester
(118) 3-Methyl-2-fluoropentanoic acid 4'-(4'''-decyloxyphenyl)phenyl ester
(119) 3-Methyl-2-fluoropentanoic acid 4'-(4'''-undecyloxyphenyl)phenyl ester
(120) 3-Methyl-2-fluoropentanoic acid 4'-(4'''-dodecyloxyphenyl)phenyl ester
(121) 3-Methyl-2-fluoropentanoic acid 4'-(4'''-tridecyloxyphenyl)phenyl ester
(122) 3-Methyl-2-fluoropentanoic acid 4'-(4'''-tetradecyloxyphenyl)phenyl ester
(123) 3-Methyl-2-fluoropentanoic acid 4'-(4'''-pentadecyloxyphenyl)phenyl ester
(124) 3-Methyl-2-fluoropentanoic acid 4'-(4'''-hexadecyloxyphenyl)phenyl ester
(125) 3-Methyl-2-fluoropentanoic acid 4'-(4'''-heptadecyloxyphenyl)phenyl ester
(126) 3-Methyl-2-fluoropentanoic acid 4'-(4'''-octadecyloxyphenyl)phenyl ester
(127) 3-Methyl-2-fluoropentanoic acid 4'-(4'''-methoxyphenyl)phenyl ester
(128) 3-Methyl-2-fluoropentanoic acid 4'-(4'''-ethoxyphenyl)phenyl ester
(129) 4-Methyl-2-fluoropentanoic acid 4'-(4'''-propoxyphenyl)phenyl ester
(130) 4-Methyl-2-fluoropentanoic acid 4'-(4'''-butoxyphenyl)phenyl ester
(131) 4-Methyl-2-fluoropentanoic acid 4'-(4'''-pentoxyphenyl)phenyl ester
(132) 4-Methyl-2-fluoropentanoic acid 4'-(4'''-hexyloxyphenyl)phenyl ester
(133) 4-Methyl-2-fluoropentanoic acid 4'-(4'''-heptyloxyphenyl)phenyl ester
(134) 4-Methyl-2-fluoropentanoic acid 4'-(4'''-octyloxyphenyl)phenyl ester
(135) 4-Methyl-2-fluoropentanoic acid 4'-(4'''-nonyloxyphenyl)phenyl ester
(136) 4-Methyl-2-fluoropentanoic acid 4'-(4'''-decyloxyphenyl)phenyl ester
(137) 4-Methyl-2-fluoropentanoic acid 4'-(4'''-undecyloxyphenyl)phenyl ester
(138) 4-Methyl-2-fluoropentanoic acid 4'-(4'''-dodecyloxyphenyl)phenyl ester
(139) 4-Methyl-2-fluoropentanoic acid 4'-(4'''-tridecyloxyphenyl)phenyl ester
(140) 4-Methyl-2-fluoropentanoic acid 4'-(4'''-tetradecyloxyphenyl)phenyl ester
(141) 4-Methyl-2-fluoropentanoic acid 4'-(4'''-pentadecyloxyphenyl)phenyl ester
(142) 4-Methyl-2-fluoropentanoic acid 4'-(4'''-hexadecyloxyphenyl)phenyl ester
(143) 4-Methyl-2-fluoropentanoic acid 4'-(4'''-heptadecyloxyphenyl)phenyl ester
(144) 4-Methyl-2-fluoropentanoic acid 4'-(4'''-octadecyloxyphenyl)phenyl ester
(145) 3-Methyl-2-butanoic acid 4'-(4'''-methoxyphenyl)phenyl ester
(146) 3-Methyl-2-butanoic acid 4'-(4'''-ethoxyphenyl)phenyl ester
(147) 3-Methyl-2-butanoic acid 4'-(4'''-propoxyphenyl)phenyl ester
(148) 3-Methyl-2-butanoic acid 4'-(4'''-butoxyphenyl)phenyl ester
(149) 3-Methyl-2-fluoropentanoic acid 4'-(4'''-pentoxyphenyl)phenyl ester
(150) 3-Methyl-2-fluoropentanoic acid 4'-(4'''-hexyloxyphenyl)phenyl ester
(151) 3-Methyl-2-fluoropentanoic acid 4'-(4'''-heptyloxyphenyl)phenyl ester
(152) 3-Methyl-2-butanoic acid 4'-(4'''-octyloxyphenyl)phenyl ester
(153) 3-Methyl-2-butanoic acid 4'-(4'''-nonyloxyphenyl)phenyl ester
(154) 3-Methyl-2-butanoic acid 4'-(4'''-decyloxyphenyl)phenyl ester
(155) 3-Methyl-2-butanoic acid 4'-(4'''-undecyloxyphenyl)phenyl ester
(156) 3-Methyl-2-butanoic acid 4'-(4'''-dodecyloxyphenyl)phenyl ester
(157) 3-Methyl-2-butanoic acid 4'-(4'''-tridecyloxyphenyl)phenyl ester
(158) 3-Methyl-2-butanoic acid 4'-(4'''-tetradecyloxyphenyl)phenyl ester
(159) 3-Methyl-2-butanoic acid 4'-(4'''-pentadecyloxyphenyl)phenyl ester
(160) 3-Methyl-2-butanoic acid 4'-(4'''-hexadecyloxyphenyl)phenyl ester
(161) 3-Methyl-2-butanoic acid 4'-(4'''-heptadecyloxyphenyl)phenyl ester
(162) 3-Methyl-2-butanoic acid 4'-(4'''-octadecyloxyphenyl)phenyl ester
(163) 3-Methyl-2-fluoropentanoic acid 4'-(4'''-methoxyphenyl)phenyl ester
(164) 3-Methyl-2-fluoropentanoic acid 4'-(4'''-ethoxyphenyl)phenyl ester
(165) 3-Methyl-2-fluoropentanoic acid 4'-(4'''-propoxyphenyl)phenyl ester
(166) 3-Methyl-2-fluoropentanoic acid 4'-(4'''-butoxyphenyl)phenyl ester
(167) 3-Methyl-2-fluoropentanoic acid 4'-(4'''-pentoxyphenyl)phenyl ester
(168) 3-Methyl-2-fluoropentanoic acid 4'-(4'''-hexyloxyphenyl)phenyl ester
(169) 3-Methyl-2-fluoropentanoic acid 4'-(4'''-heptyloxyphenyl)phenyl ester
(170) 3-Methyl-2-fluoropentanoic acid 4'-(4'''-octyloxyphenyl)phenyl ester
(171) 3-Methyl-2-fluoropentanoic acid 4'-(4'''-nonyloxyphenyl)phenyl ester
(172) 3-Methyl-2-fluoropentanoic acid 4'-(4'''-decyloxyphenyl)phenyl ester
(173) 3-Methyl-2-fluoropentanoic acid 4'-(4'''-undecyloxyphenyl)phenyl ester
(174) 3-Methyl-2-fluoropentanoic acid 4'-(4'''-dodecyloxyphenyl)phenyl ester
(175) 3-Methyl-2-fluoropentanoic acid 4'-(4'''-tridecyloxyphenyl)phenyl ester
(176) 3-Methyl-2-fluoropentanoic acid 4'-(4'''-tetradecyloxyphenyl)phenyl ester
(177) 3-Methyl-2-fluoropentanoic acid 4'-(4'''-pentadecyloxyphenyl)phenyl ester
(178) 3-Methyl-2-fluoropentanoic acid 4'-(4'''-hexadecyloxyphenyl)phenyl ester
(179) 3-Methyl-2-fluoropentanoic acid 4'-(4'''-heptadecyloxyphenyl)phenyl ester
(180) 3-Methyl-2-fluoropentanoic acid 4'-(4'''-octadecyloxyphenyl)phenyl ester The phase transition temperature of each of the compounds of Examples 1 and 2 are shown in Table 2. The symbols except SX* used have the same meaning as in Table 1, and SX* stands for the chiral smectic phase which could not be identified yet.

TABLE 2

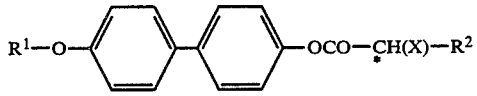

| R1 | R3 | phase transition temperature (°C.) | | | |
|---|---|---|---|---|---|
| | | C | SC* | SA | I |
| C1H3 | —CH(Cl)—CH(CH3)—C2H5 | • | | 55• | 63• |
| C5H11 | * * | • | 50• | 57• | 64• |
| C6H13 | | • | 47• | 58• | 62• |
| C7H15 | | • | 42• | 52• | 60• |
| C8H17 | | • | 33• | 56• | 66• |
| C9H19 | | • | 40• | 43• | 67• |
| C10H21 | | • | 32• | 66• | 49• |
| C12H25 | | • | 62• | 66• | 67• |
| C14H25 | | • | | | 68• |
| C18H37 | | • | | | 74• |
| C6H13 | —CH(Br)—CH(CH3)—C2H5 | • | 47• | 55 | • |
| C8H17 | * * | • | 29• | 47• | 55• |
| C10H21 | | • | 35• | 49• | 58• |
| C12H25 | | • | 42• | 47• | 59• |
| C6H13 | —CH(Cl)—CH2—CH—CH3 | • | 62• | 65• | 74• |
| C7H15 | *           \| | • | 56• | 63• | 64• |
| C8H17 |             CH3 | • | 61• | 64• | 68• |
| C9H19 | | • | | | 69• |
| C10H21 | | • | | | 70• |
| C12H25 | | • | | | 75• |
| C6H13 | —CH(Cl)—CH(CH3)2 | • | | 72• | 77• |
| C7H15 | * | • | 67• | 73• | 77• |
| C8H17 | | • | 63• | 71• | 80• |
| C10H21 | | • | 66• | 69• | 81• |
| C12H25 | | • | | 83• | 85• |
| C8H17 | —CH(Cl)—CH2—⌬ | • | | | 80• |
| C6H13 | —CH(Br)—CH(CH3)2 | • | 64• | 67 | • |
| C8H17 | * | • | 35• | 48• | 56• |
| C10H21 | | • | 55• | 57• | 68• |
| C12H25 | | • | | 69• | 70• |
| C8H17 | —CH(Cl)—CH(CH3)—C2H5 | • | 59• | 59• | 60• |
| | * * * | | | | |
| C8H17 | —CH(F)—CH(CH3)—C2H5 | • | 84• | 86• | 94• |
| | * * * | | | | |

| | | (SX*) | | |
|---|---|---|---|---|
| C7H15 | —CH(F)—CH(CH3)2 | • | 89• | 105• | 107• |
| C8H17 | * | • | 95• | 103• | 109• |

The absolute configuration of the asummetric carbon atom marked with * is S—form and marked * * is R—form.

EXAMPLE 3

A smectic liquid crystal composition of a mixture of 3-methyl-2-chloropentanoic acid 4'(4''-octyloxyphenyl)phenyl ester and 3-phenyl-2-chloropropanoic acid 4'(4''-octyloxyphenyl)phenyl ester of a molar ratio of 83:17 was prepared.

The phase transition temperatures upon cooling of the mixture are as follows: (1) The transition from the liquid phase to the smectic A phase occurs at 62° C. (2) The transition from the smectic A phase to the chiral smectic phase occurs at 58° C. (3). The transition from chiral smectic C phase to the crystal phase occurs at 24° C.

The compound of the present invention thus can expand the temperature range of ferroelectricity of a liquid crystal composition by blending an embodiment of the present compound with another ferroelectric liquid crystal compound.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A liquid crystal compound of the formula:

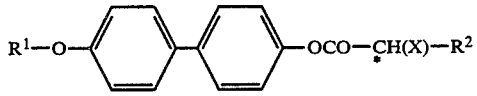

$R^1$ is an alkyl group, X is halogen, and $R^2$ is selected from the group consisting of a branched-alkyl group; and benzyl and the carbon atom marked with an * is an asymmetric carbon atom.

2. The smectic liquid compound of claim 1, wherein the alkyl group of $R^1$ contains 20 or less carbon atoms.

3. The smectic liquid compound of claim 1, wherein said X substituent is halogen and group $R^2$ is 1-methylpropyl.

4. The smectic liquid compound of claim 1, wherein said X substituent is halogen and group $R^2$ is 2-methylpropyl.

5. The smectic liquid compound of claim 1, wherein said X substituent is halogen and group $R^2$ is isopropyl.

6. The smectic liquid compound of claim 1, wherein said X substituent is halogen and group $R^2$ is benzyl.

7. A liquid crystal composition containing a smectic liquid crystal compound of the following formula as a component;

wherein $R^1$ is a alkyl group, X is halogen, $R^2$ is selected from the group consisting of a branched-alkyl group and benzyl, and the carbon atom marked with an * is an asymmetric carbon atom.

* * * * *